(12) United States Patent  (10) Patent No.: US 8,016,331 B2
Ralston et al.  (45) Date of Patent: Sep. 13, 2011

(54) ENERGY ABSORBER WITH SIDEWALL STABILIZER RIBS

(75) Inventors: Daniel D. Ralston, Farmington Hills, MI (US); Kevin E. Holdren, Tecumseh (CA); Kenneth R. Bastien, Howell, MI (US); David Gorman, Royal Oak, MI (US); Amit Kulkarni, Farmington Hills, MI (US)

(73) Assignee: Shape Corp., Grand Haven, MI (US)

( * ) Notice: Subject to any disclaimer, the term of this patent is extended or adjusted under 35 U.S.C. 154(b) by 55 days.

(21) Appl. No.: 12/369,310

(22) Filed: Feb. 11, 2009

(65) Prior Publication Data
US 2009/0206618 A1 Aug. 20, 2009

Related U.S. Application Data

(60) Provisional application No. 61/028,704, filed on Feb. 14, 2008, provisional application No. 61/028,700, filed on Feb. 14, 2008.

(51) Int. Cl.
*B60R 19/04* (2006.01)
(52) U.S. Cl. .................. 293/120; 293/121
(58) Field of Classification Search .......... 293/102, 293/120–122
See application file for complete search history.

(56) References Cited

U.S. PATENT DOCUMENTS

| | | |
|---|---|---|
| 4,275,912 A | 6/1981 | Bayer |
| 4,925,224 A | 5/1990 | Smiszek |
| 4,941,701 A | 7/1990 | Loren |
| 5,139,297 A | 8/1992 | Carpenter et al. |
| 5,290,078 A | 3/1994 | Bayer et al. |
| 5,290,079 A | 3/1994 | Syamal |
| 5,425,561 A | 6/1995 | Morgan |
| 5,871,683 A * | 2/1999 | Schaper et al. ............ 264/297.2 |
| 5,988,713 A | 11/1999 | Okamura et al. |
| 6,068,320 A | 5/2000 | Miyano |
| 6,082,792 A | 7/2000 | Evans et al. |
| 6,247,745 B1 | 6/2001 | Carroll, III et al. |
| 6,315,339 B1 | 11/2001 | Devilliers et al. |
| 6,398,275 B1 | 6/2002 | Hartel et al. |
| 6,406,081 B1 | 6/2002 | Mahfet et al. |
| 6,467,821 B2 | 10/2002 | Hirota |
| 6,575,510 B2 | 6/2003 | Weissenbom |
| 6,609,740 B2 | 8/2003 | Evans |
| 6,644,701 B2 | 11/2003 | Weissenbom et al. |
| 6,669,251 B2 | 12/2003 | Trappe |
| 6,669,252 B2 | 12/2003 | Roussel et al. |
| 6,672,635 B2 | 1/2004 | Weissenbom et al. |
| 6,685,243 B1 | 2/2004 | Evans |
| 6,715,592 B2 | 4/2004 | Suzuki et al. |
| 6,726,262 B2 | 4/2004 | Marijnissen et al. |
| 6,746,061 B1 | 6/2004 | Evans |
| 6,758,506 B2 | 7/2004 | Malteste et al. |
| 6,848,730 B2 | 2/2005 | Evans |
| 6,866,313 B2 | 3/2005 | Mooijman et al. |

(Continued)

*Primary Examiner* — Dennis H Pedder
(74) *Attorney, Agent, or Firm* — Price Heneveld LLP

(57) ABSTRACT

A vehicle bumper system includes an elongated reinforcement beam for mounting to a vehicle frame and an energy absorber abutting a front surface of the reinforcement beam. The energy absorber includes longitudinally-elongated hollow crush lobes configured to crush and absorb energy upon a vehicle crash, the crush lobes including interconnected top, bottom, side and front walls. At least one opposing pair of the walls, such as the top and bottom walls, are elongated parallel a length of the beam to define enlarged areas that are generally unsupported, but the one pair of walls further include a plurality of spaced external ribs extending perpendicular to the length for stabilizing the enlarged areas.

20 Claims, 5 Drawing Sheets

U.S. PATENT DOCUMENTS

| | | | |
|---|---|---|---|
| 6,874,831 B1 * | 4/2005 | Pouget et al. ................. 293/115 |
| 6,874,832 B2 | 4/2005 | Evans et al. |
| 6,877,785 B2 | 4/2005 | Evans et al. |
| 6,890,009 B2 | 5/2005 | Murata et al. |
| 6,908,127 B2 | 6/2005 | Evans |
| 6,923,494 B2 | 8/2005 | Shuler et al. |
| 6,938,936 B2 | 9/2005 | Mooijman et al. |
| 6,949,209 B2 | 9/2005 | Zander et al. |
| 6,962,379 B2 | 11/2005 | Minami et al. |
| 6,994,384 B2 | 2/2006 | Shuler et al. |
| 6,997,490 B2 | 2/2006 | Evans et al. |
| 7,044,515 B2 | 5/2006 | Mooijman et al. |
| 7,052,056 B2 | 5/2006 | Weissenborn et al. |
| 7,073,831 B2 | 7/2006 | Evans |
| 7,086,690 B2 | 8/2006 | Shuler et al. |
| 7,131,674 B2 | 11/2006 | Evans et al. |
| 7,134,700 B2 | 11/2006 | Evans |
| 7,144,054 B2 | 12/2006 | Evans |
| 7,144,055 B2 | 12/2006 | Kimura et al. |
| 7,159,911 B2 | 1/2007 | Nguyen et al. |
| 7,163,242 B2 | 1/2007 | Shuler et al. |
| 7,163,243 B2 | 1/2007 | Evans |
| 7,172,227 B2 | 2/2007 | Weissenborn et al. |
| 7,188,876 B2 | 3/2007 | Jaarda et al. |
| 7,204,545 B2 | 4/2007 | Roux et al. |
| 7,220,374 B2 | 5/2007 | Zander et al. |
| 7,222,896 B2 | 5/2007 | Evans |
| 7,222,897 B2 | 5/2007 | Evans et al. |
| 7,234,741 B1 | 6/2007 | Reynolds et al. |
| 7,278,667 B2 | 10/2007 | Mohapatra et al. |
| 7,296,833 B2 | 11/2007 | Mohapatra et al. |
| 7,399,014 B2 * | 7/2008 | Mellis et al. ................. 293/120 |
| 2002/0060462 A1 | 5/2002 | Glance |
| 2004/0036302 A1 | 2/2004 | Shuler et al. |
| 2004/0066048 A1 | 4/2004 | Mooijman et al. |
| 2004/0094975 A1 * | 5/2004 | Shuler et al. ................. 293/120 |
| 2004/0174025 A1 | 9/2004 | Converse et al. |
| 2004/0201255 A1 | 10/2004 | Jonsson |
| 2004/0256867 A1 | 12/2004 | Evans et al. |
| 2005/0269837 A1 | 12/2005 | Carroll, III et al. |
| 2006/0001277 A1 | 1/2006 | Mellis et al. |
| 2006/0018089 A1 | 1/2006 | Chou |
| 2006/0181089 A1 * | 8/2006 | Andre et al. ................. 293/120 |
| 2006/0261611 A1 | 11/2006 | Mohapatra et al. |
| 2007/0069535 A1 * | 3/2007 | Mohapatra et al. ........... 293/121 |
| 2007/0210615 A1 | 9/2007 | Tamada |
| 2007/0257497 A1 * | 11/2007 | Heatherington et al. ..... 293/120 |

\* cited by examiner

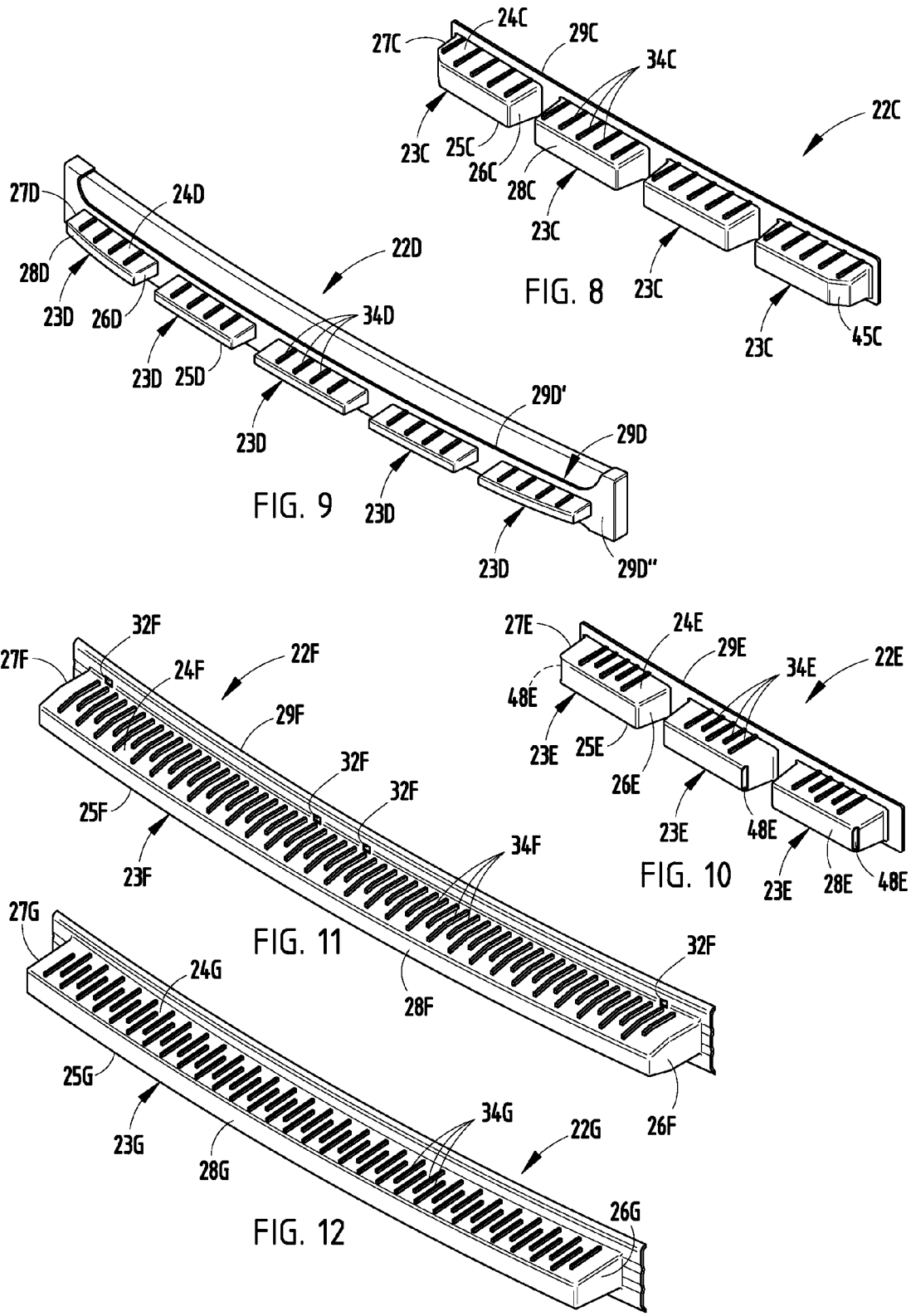

ENERGY ABSORBER WITH SIDEWALL STABILIZER RIBS

This application claims benefit under 35 U.S.C. §119(e) of provisional application Ser. No. 61/028,704, filed Feb. 14, 2008, entitled ENERGY ABSORBER WITH EXTERNAL STABILIZER RIBS, and further claims benefit of provisional application Ser. No. 61/028,700, filed Feb. 14, 2008, entitled ENERGY ABSORBER WITH INTERNALLY SUPPORTED CRUSH BOXES, both of which are co-assigned and incorporated herein in their entirety.

BACKGROUND

The present invention relates to bumper systems using energy absorbers, and more particularly to automotive polymeric energy absorbers such as for a vehicle front or rear bumper. However, a scope of the present invention is not believed to be limited to only bumper energy absorbers and/or bumper systems.

Many automotive bumper systems include metal reinforcement beams and polymeric energy absorbers tuned for very specific energy absorption profiles, including "softer" initial impact strokes for pedestrian safety and "harder" deep-stroke impacts such as for vehicle-to-stationary-object impacts. Consistency and predictability of energy absorption over the bumper system's stroke during an impact is very important. Many energy absorbers have multi-sided crush boxes for consistent and predictable energy absorption. For example, see the energy absorbers shown in Weissenborn U.S. Pat. No. 6,575,510 and Evans U.S. Pat. No. 6,609,740.

However, complexity of the energy absorber adversely affects the lead times required by mold shops for providing the molds, and further adversely affects moldability of the parts, such as by adding to die cost and mold cycle times and maintenance. Complexity can come from many things, including the shape, size, and/or number of crush boxes required. This results in conflicting design requirements. On the one hand, energy absorbers can be designed to have smaller crush boxes, but the molds (and the molding process) become more complex due to an increased number of crush boxes required to cover the front surface area of the bumper reinforcement. Further, the energy absorbers become much heavier due to additional material in the walls of the "additional" crush boxes, and mold cycle times increase due to the additional material. Also, molds can become more complex due to undulations and other structure placed in the walls. Energy absorbers are easier to mold (and lighter in weight) when they have larger crush boxes, but large unsupported areas in the walls of the crush boxes tend to be unstable, leading to premature collapse during impact (i.e., inconsistency) and/or poor energy absorption. Efforts to stabilize the walls usually add to part weight (such as by adding to material thickness of the walls) and/or to part complexity (such as by adding attachments to anchor the walls in predetermined positions).

Another consideration is the lead times in bumper development programs. The vehicle industry is under immense pressure to reduce lead times for designing and bringing a product to market. Yet, tooling must often be started early in the program. The reinforcement beam and energy absorber are then "tuned" in order to obtain optimal energy absorption profiles (i.e., force versus displacement). "Tuning" of bumper systems can be difficult and time consuming in and of itself, particularly when the molds must be sent offsite in order to machine in thicker walls or new wall shapes.

SUMMARY OF THE PRESENT INVENTION

In one aspect of the present invention, a bumper system for vehicles includes an elongated reinforcement beam adapted for mounting to a vehicle frame and an energy absorber abutting a front surface of the reinforcement beam. The energy absorber includes at least one hollow crush lobe configured to crush and absorb energy upon a vehicle crash, the at least one crush lobe including interconnected top, bottom, end and front walls. At least one opposing pair of the walls is elongated parallel a length of the beam to define enlarged areas that are generally unsupported, but the one pair of walls further include external ribs extending perpendicular to the length for stabilizing the enlarged areas, such as by adding stiffeners to the walls to prevent premature collapse.

In another aspect of the present invention, a bumper system for vehicles includes an elongated reinforcement beam having a length and adapted for mounting to a vehicle frame. A stabilizing component is positioned on a front of the beam and includes raised areas defining recesses. An energy absorber abuts the stabilizing component and includes at least one hollow crush lobe configured to crush and absorb energy upon a vehicle crash. The at least one crush lobe includes interconnected top, bottom, end and front walls, with at least one opposing pair of the walls being elongated parallel a length of the beam to define enlarged areas that are generally unsupported. The at least one crush lobe further includes wall-supporting ribs extending generally perpendicular to the length for stabilizing the enlarged areas. The raised areas in the component extend partially into the at least one crush lobe.

In another aspect of the present invention, a bumper system for vehicles includes an elongated reinforcement beam having a length and adapted for mounting to a vehicle frame, and includes an energy absorber positioned on a front surface of the reinforcement. The energy absorber includes a plurality of crush lobes configured to crush and absorb energy upon a vehicle crash. The crush lobes each include interconnected top, bottom, end and front walls. At least one opposing pair of the walls are elongated parallel a length of the beam to define enlarged areas that are generally unsupported. The top and bottom walls include external ribs extending generally perpendicular to the length for stabilizing the enlarged areas. The end walls include crush-initiating apertures for reducing a crush stiffness of the end walls to tune the energy absorber to provide a more uniform resistance to impact along the length of the reinforcement beam.

In another aspect of the present invention, a method of tuning a vehicle bumper system for desired energy absorption characteristics includes steps of providing a bumper subassembly including a beam and an energy absorber on a front of the beam. The energy absorber includes at least one crush lobe for energy absorption during an impact. The method includes testing the bumper subassembly for energy absorption by impacting the subassembly to simulate a vehicle crash. The method further includes tuning the bumper subassembly by doing one, two, or all of modifying existing external ribs on the at least one crush lobe, forming new external ribs on the at least one crush lobe, and/or forming crush-initiating apertures in end walls of the at least one crush lobe.

The present invention focuses on a discovery that stability of enlarged walls in crush lobes of energy absorbers can be greatly improved by external ribs. The external ribs are easily placed in molds and can be readily modified in the mold tooling, thus leading to improved/shorter mold lead times, improved and simplified molds, etc. Additionally, the ribs can be quickly and easily modified in prototype samples during the development phase of a program. Further, the external ribs can be sometimes be used for additional functions, such as to support fascia on the bumper system. The ribs can also be used to tune performance by having a varying height or width or location. This is highly advantageous because it allows the walls of the lobe to have a uniform thickness which provides a better molding condition. Furthermore, when the external ribs are placed at consistent intervals or at critical areas, the performance of the energy absorber is more consistent across its length, which is highly desirable for some impacts such as pedestrian impacts. Similarly, the frequency of the ribs can be decreased towards the ends of the lobe to normalize the stiffness since the end wall makes the lobe naturally stiffer at that location.

These and other aspects, objects, and features of the present invention will be understood and appreciated by those skilled in the art upon studying the following specification, claims, and appended drawings.

BRIEF DESCRIPTION OF DRAWINGS

FIGS. 8-14 are perspective views of modified energy absorbers including different arrangements of external ribs.

DETAILED DESCRIPTION OF PREFERRED EMBODIMENTS

Figure 1:
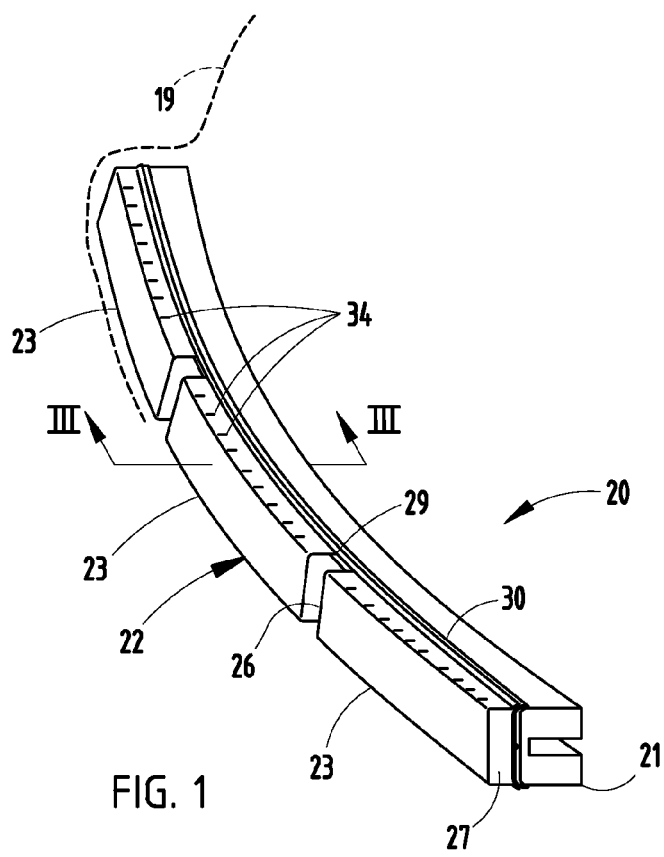
FIG. 1 is a perspective view of the present bumper system including a reinforcement beam with front-mounted energy absorber embodying the present concepts.
Figure 2:
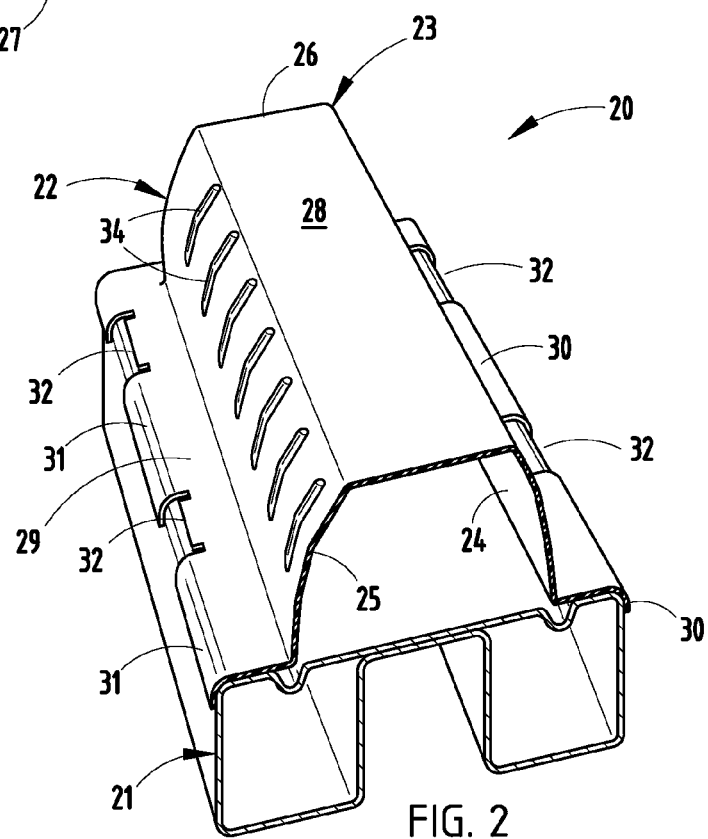
FIG. 2 is a fragmentary view of FIG. 1.
Figure 3:
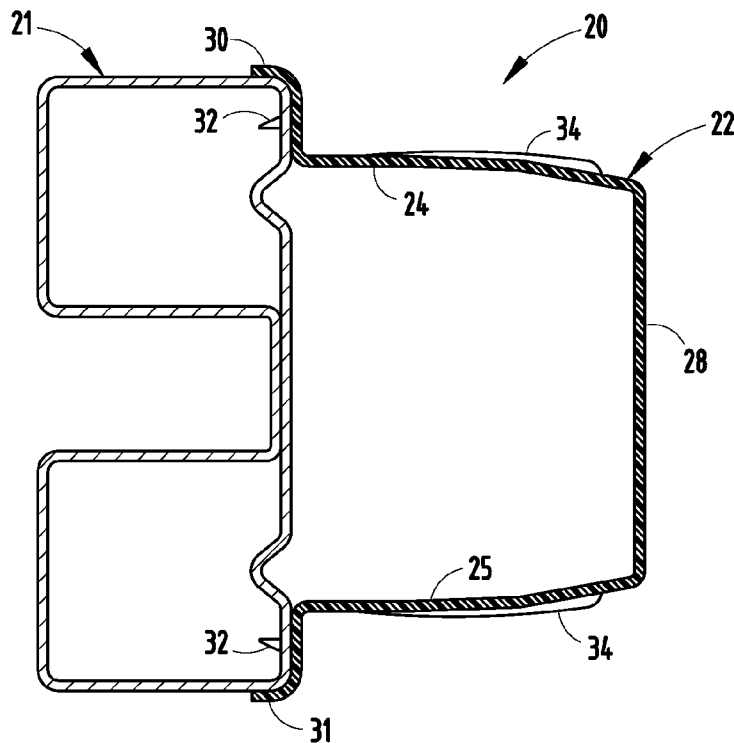
FIG. 3 is a cross section taken through FIG. 1.
Figure 4:
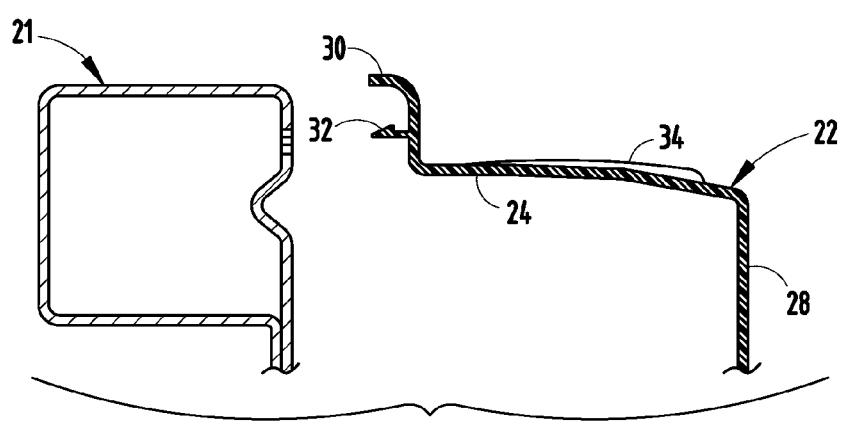
FIG. 4 is an exploded view of FIG. 3.

A vehicle bumper system 20 (FIG. 1) includes an elongated steel B-shaped reinforcement beam 21 with ends adapted/configured for mounting to a vehicle frame, and further includes a polymeric energy absorber 22 abutting or parallel to a front surface of the reinforcement beam 21 and positioned under (and supporting) the vehicle RIM fascia 19. (It is contemplated that the energy absorber 22 could be connected to and supported by the fascia 19 and/or to the beam 20.) The energy absorber 22 includes three (or more or less) longitudinally-elongated hollow crush lobes 23 configured to crush and absorb energy upon a vehicle crash. Specifically, the crush lobes 23 each include interconnected wall structure forming a box shape (often called a "crush box"), including a top side wall 24, a bottom side wall 25, end walls 26-27 and a front wall 28. The energy absorber 22 further includes a frame comprising a rear wall 29 and top and bottom flanges 30-31 for retaining the crush lobes 23 to the reinforcement beam 21. Integrally-formed hook-shaped connectors 32 extend from the rear wall 29 for engaging holes 33 in the beam 21 to retain the energy absorber 22 on the beam 21. A plurality of spaced-apart integrally-formed external ribs 34 are formed on the top and bottom walls 24-25 to define, in cross section, T-shaped joined arrangements, with the ribs 34 protruding in a direction generally vertical and perpendicular to the elongated length of the crush lobes 23 (and perpendicular to the length of the beam 21). The illustrated top and bottom walls 24-25 are slightly conic or curvilinearly shaped, such that when impacted in a direction perpendicular to a front surface of the energy absorber 22, the energy absorber 22 (including walls 24-25) bend, crush and collapse with a very predictable, consistent and highly efficient energy-absorbing manner. The ribs 34 stabilize the walls 24-25 significantly improving crush efficiency.

The illustrated crush lobes 23 are elongated, such that the top and bottom walls 24-25 define enlarged unsupported areas, especially near their middle regions which are spaced from the end walls 26-27. If the ribs 34 are not present, (i.e., if these areas are "rib-less" and unsupported), these areas are relatively unstable when compared to other areas of the crush lobes 23, such that these areas tend to collapse first during an impact. Further, these "rib-less" unsupported areas will tend to collapse in a manner that absorbs less energy than desired, significantly reducing energy absorption efficiency. (Energy absorption efficiency refers to the ability of the energy absorber 22 during an impact to initially provide a desired level of resistance to impact, and continue to provide that resistance and also absorb energy during the impact stroke.) For example, the unsupported areas may buckle at a single mid-point instead of "crinkling" and crushingly folding at multiple and irregular locations over their spans. The existence of the external ribs 34 greatly and significantly reduces this problem, and in turn improves the energy absorption crush efficiency by a surprising and unexpected amount. Furthermore, the length, height and taper of the ribs can be used to help define where the buckle point will be thus improving correlation to finite element analysis and helping to tune the performance to match a specific load profile.

By the present arrangement, the present energy absorber 22 is a high efficiency crushable energy absorber, meaning that it quickly comes up to the force resistance desired and holds that force resistance over a desired portion of the impact/bumper stroke while absorbing substantial amounts of energy. The present energy absorber 22 comprises transversely extending horizontal walls 24-25 with a conic or curvilinear cross-sectional shape. However, it is contemplated that a scope of the present inventive concepts includes planar walls and other wall shapes. These walls 24-25 incorporate external ribs 34 that allow the performance to be tuned by adjusting the length and depth of the ribs 34 so that the walls can maintain a uniform thickness to promote good molding conditions. The rib 34 spacing is also important to optimal wall stability and energy absorption. Some analysis suggests that good performance comes when the ribs 34 are spaced apart between about 20 mm and 50 mm, or more preferably are spaced apart about 25 mm on center. However, it is noted that the optimum rib spacing is somewhat dependent on the package space, environment and desired performance characteristics for a vehicle. Notably, external ribs can be particularly important near a center of the unsupported area of the side walls, at locations farthest from the end walls. Also, external ribs can be located at strategic locations and do not have to extend to a full height of the side walls. For example, one application uses external ribs that taper to a narrow end, the narrow end being well short of the top wall of the respective crush box.

As a result of the improved crush efficiency of the present energy absorber 22, the illustrated design was able to achieve a 50 mm package depth, which is a smaller space than initially proposed designs. This is due in a significant part to the exterior ribs 34, which stabilize the "larger" walls and hence facilitate a higher crush efficiency. The top and bottom walls 24-25 were curvilinear or "conic" for improved crush efficiency and predictability of energy absorption on impact, however it is contemplated that the present concept will work on other wall configurations, such as planar wall sections. In the present case, the target load level of 5 kN was achieved, and target minimum internal energy of energy absorption during the initial "lower leg" portion of the impact stroke was tested to be 175 J, which was a favorable energy absorption. Total crush efficiency of the illustrated energy absorber with ribs placed, shaped, and sized as shown was 88% . . . as compared to only 76% for a similar energy absorber without the ribs. By optimal tuning to an energy absorber for a particular bumper system (i.e., improved placement, shape and size of the ribs), crush efficiency can be increased up to about 90%, based on testing. For example, it may be beneficial to slightly increase a density of the ribs 34 near a center of the crush lobe 23, and/or to space them slightly from the ends of the crush lobe 23, and/or to vary their size, depth, shape, density, and length. This can be determined by testing. Further, this can be done fairly quickly in tools without long lead times. It is also contemplated that apertures can be formed into the end walls 26-27 to reduce the stiffness at ends of the crush boxes, and so that the crush boxes have a more uniform stiffness across their entire length, which sometimes is a requirement of vehicle manufacturers.

The present energy absorber is injection molded, and the beam rollformed of high strength steel. For example, the energy absorber can be molded from TPO material, or from PCT/PB material, and the beam rollformed from a sheet of 120 ksi tensile strength steel of about 1.6 mm thickness into a B-shaped cross section. However, it is contemplated that various plastic and metal materials can be used, and that various processes for forming them also used. Notably, the illustrated B beam is longitudinally swept but has a (vertically) flat front wall and an embossed channel centrally located over each of its two tubes that acts to stabilize the front wall upon substantial impact. The top and bottom walls in the energy absorber can be positioned directly over the channels, such that upon impact, the top and bottom walls extend into the channels which temporarily hold the walls on the front wall during early stages of the impact. Alternatively, the top and bottom walls in the energy absorber can directly engage a flat portion of the (vertically) flat front wall and work well.

Additional embodiments are shown using similar numbers for similar and identical features, characteristics and aspects, but adding the letters "A," "B," etc. This is done to reduce redundant discussion. The discussion and description of each feature for first-described items is intended to "carry forward" and apply to the later identified items unless otherwise noted.

Figure 5:
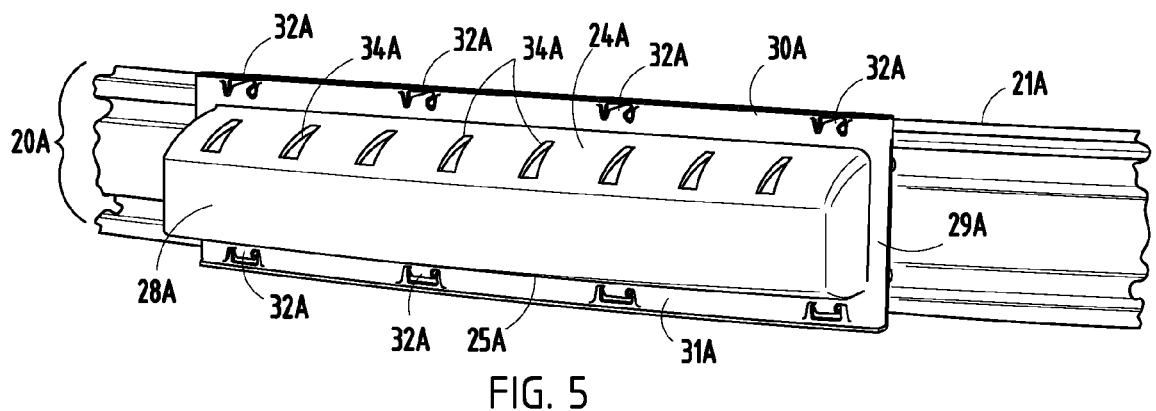
FIG. 5 is an alternative embodiment where the energy absorber is shorter than a length of the beam.

FIG. 5 illustrates another energy absorber 22A similar to the energy absorber 22 (FIG. 1) but extending shorter than a length of its beam 21A. For example, three separate energy absorbers 22A, each defining a single crush lobe 23A, can be used in place of the single energy absorber 22, each having particular functional characteristics for their particular location and vehicle.

Figure 6:
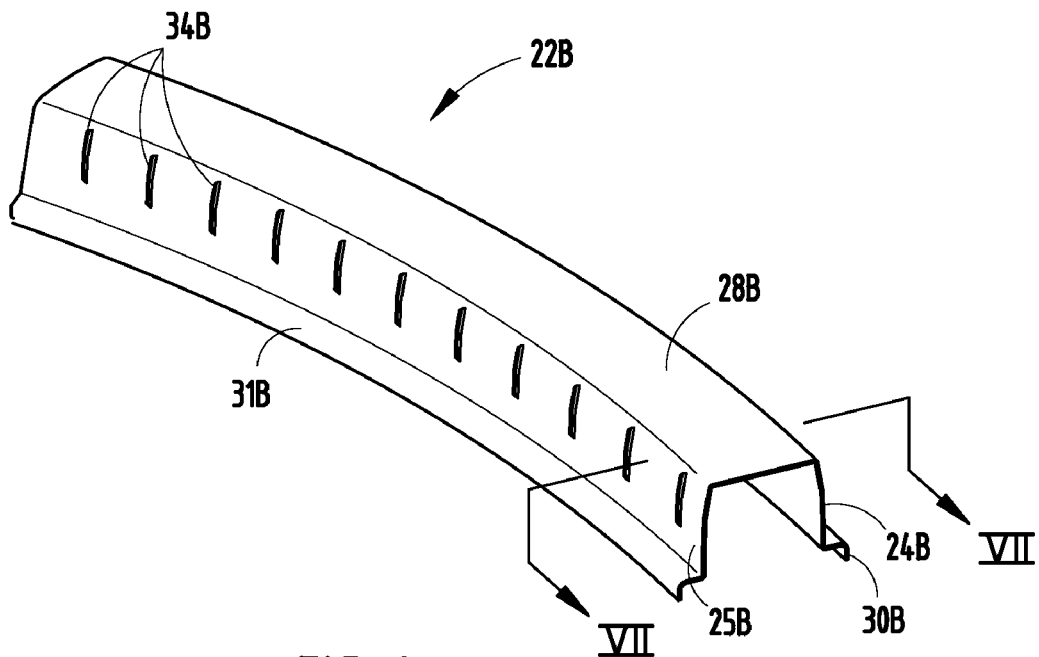
FIG. 6 is another alternative embodiment of the energy absorber.
Figure 7:
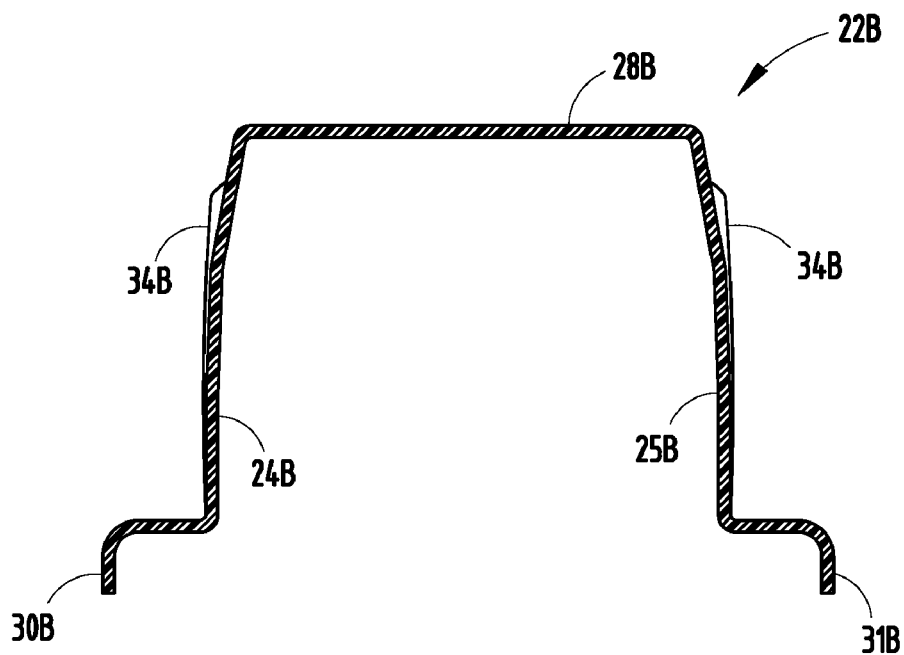
FIG. 7 is a cross section through FIG. 6.

FIGS. 6-7 illustrate another energy absorber where the crush lobe is elongated to a greater extent than in energy absorber 22. Also, a cross-sectional profile of the walls 24B-25B has been modified to be relatively straight (with only a very slight bend) along with more generous radii at each corner/joint.

FIG. 8 illustrates an energy absorber 22C with four crush lobes 23C on a rear wall 29C, each crush lobe 23C having walls 24C-28C. Notably, the front wall 28C on the outboard two crush lobes 23C includes an outboard section 45C that is more angled than the remaining front walls 28C of the other crush lobes 23C such that it forms a corner of a vehicle that is rearwardly swept and more aerodynamically shaped. The corner formed by joindure of the walls 24C-27C to the front wall 28C is generously radiused. Six external ribs 34C are relatively uniformly spaced across a length of the side walls 24C-25C, and they extend vertically about 90% of the distance of the side walls 24C-25C. Further, there is a rib 34C positioned relatively close to each of the end walls 26C-27C.

FIG. 9 illustrates an energy absorber 22D with five crush lobes 23D, each having walls 24D-28D. The top and bottom walls 24D-25D are angled somewhat toward each other and have a greater draft angle, such that a cross section of the crush lobes 23D has a more pointed profile than energy absorbers 22-22C. Notably, the outboard ends of the outboard crush lobes 23D have a shorter fore-aft dimension than their inboard ends, such that the energy absorber 22D is aerodynamically shaped with more rearwardly swept portions near the fenders. The external ribs 34D are spaced away from the end walls 27D, and are shallower in depth. The external ribs 34D extend only about 80% of the distance of the walls 24D-25D. Also the rear wall 29D includes enlarged top and bottom areas 29D' that form a total height that is about 4 times a vertical height of the crush lobes 23D. Also, the rear wall 29D includes enlarged end areas 29D" that are swept rearwardly at its outboard ends, and further which define an aesthetically curved shape that extends from the top, bottom and sides of the outermost crush lobes 23D rearwardly, upwardly and downwardly in a manner supporting a similarly shaped fascia.

FIG. 10 illustrates an energy absorber 22E with three crush lobes 23E, each having walls 24E-28E. The top and bottom walls 24E-25E are angled somewhat toward each other but they are spaced farther apart than in energy absorber 22E. The external ribs 34E define a first spaced-apart dimension from each other, but the outboard ribs 34E define a greater second spaced-apart dimension (greater than the first spaced-apart dimension) away from the end walls 27E. Further, the external ribs 34E are not uniform in length. Instead, every other rib 34E is about half a length of the longer ribs, such as only about 40%-50% of the full length distance of the walls 24E-25E. This was done to gradually increase the load during the impact event to meet a specified load profile. Some of the end walls 26E-27E have an irregularly shaped crush-initiation aperture 48E that weakens the crush lobes 23E in the area of end walls 26E-27E. The illustrated apertures 48E are about 20%-30% of the surface area of the end walls 26E-27E, and extend from its top about 20%-30% of the way toward a bottom of the crush lobes 23E. It is contemplated that they can be larger or smaller or differently shaped. This is so that the energy absorber 22E provides a more uniform crush across its length, even if struck near one of the end walls 26E or 27E by an object having a narrow surface area (such as a post or a pedestrian's leg).

FIG. 11 illustrates an energy absorber 22F with a single crush lobe 23F formed by walls 24F-28F. The top and bottom walls 24F-25F are shaped and arranged similar to those of energy absorber 22 and 22A. The external ribs 34F are not spaced far away from the end walls 27F. The external ribs 34F extend only about 60%-70% of a dimension of the walls 23F-24F, and every other rib is shallower than adjacent ribs, again to meet a particular load profile. Integrally formed connectors 32F are formed along the rear wall 29F. Notably, the rear wall 29F includes depressions matingly engaging the embossed channels in the front wall of the B beam (see the two channels in the front wall of the B beam 21). Integrally formed connectors 32F (hooks) extend rearwardly from the base flange 29F.

FIG. 12 illustrates an energy absorber 22G with a single crush lobe 23G formed by walls 24G-28G, similar to energy absorber 22F. The external ribs 34G are not spaced far away from the end walls 27F. The energy absorber 22G is slightly longitudinally swept, but is somewhat straighter than the energy absorber 22F, and further the crush lobe 23G is somewhat wider and shorter in height than the crush lobe 23F. The ribs 34G extend only about 40%-50% of a dimension of the walls 23F-24F, and every other rib 34G is close to the front wall 28G and the (alternating) others are close to the rear wall 29G. There is a reasonably high density of ribs, and they are fairly shallow.

Figure 13:
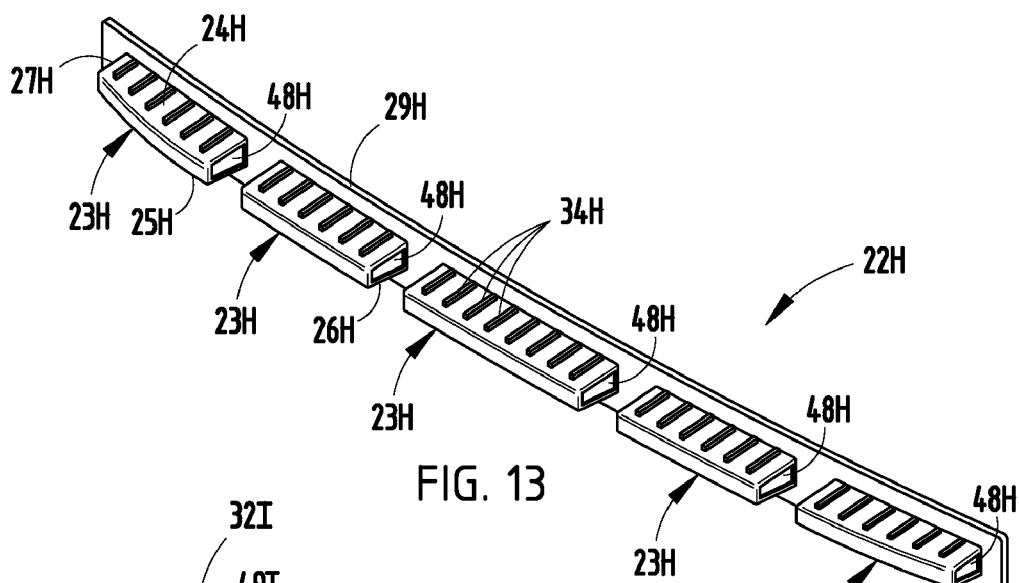

FIG. 13 illustrates an energy absorber 22H with five crush lobes 23H on a rear wall 29H, each crush lobe 23H having walls 24H-28H and ribs 34H. The energy absorber 22H is not totally unlike the energy absorber 22C. However, the end walls 26H-27H have an irregularly shaped crush-initiation aperture 48H that weakens the crush lobes 23H in the area of end walls 26H-27H. The illustrated apertures 48H are about 50%-60% of the surface area of the end walls 26H-27H, and extend from top to bottom of the crush lobes 23H. It is contemplated that they can be larger or smaller or differently shaped. This is so that the energy absorber 22H provides a more uniform crush across its length, even if struck near one of the end walls 26H or 27H by an object having a narrow surface area (such as a post or a pedestrian's leg).

Figure 14:
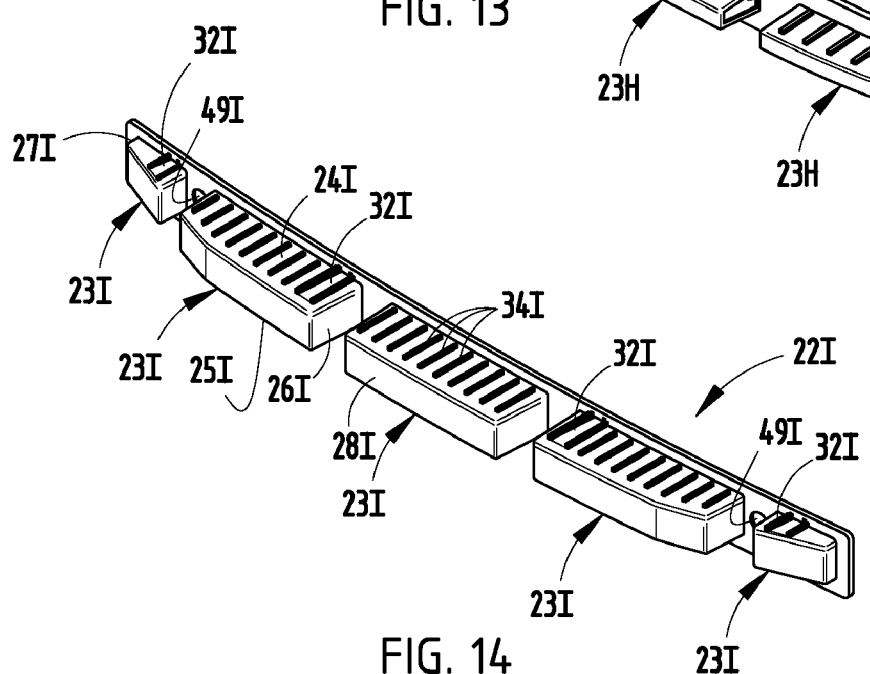

FIG. 14 illustrates an energy absorber 22I with five crush lobes 23I on a rear wall 29I, each crush lobe 23I having walls 24I-28I. Notably, the front wall 28I on the outboard two crush lobes 23I includes a front wall 29I that is substantially more angled than the remaining front walls 29I in the other crush lobes 23I, such that it forms a corner of a vehicle that is rearwardly swept and more aerodynamically shaped. A plurality of external ribs 34I are relatively uniformly spaced across a length of the side walls 24I-25I, and they extend vertically about 90% of the distance of the side walls 24I-25I. The outer two crush lobes 23I are spaced an additional amount from the other crush lobes 23I to leave room for holes 49I. Holes 49I provide passage of tow hooks or wiring and fog lights. The holes 49I can also provide access to bolts/fasteners for mounting/securing a bumper subassembly (i.e., bumper beam, energy absorber, fascia, and related pre-assembled components) to the vehicle frame rail tips.

As discussed above, stability of enlarged walls in crush lobes of energy absorbers can be greatly improved by the presence of external ribs. The external ribs are easily placed in molds and also easily modified by die tryout personnel without outsourcing work on the molds, thus leading to improved mold lead times, improved and simplified molds, etc. Ribs can allow the lobe walls to remain a constant thickness which simplifies the mold and makes part processing easier.

Figure 15:
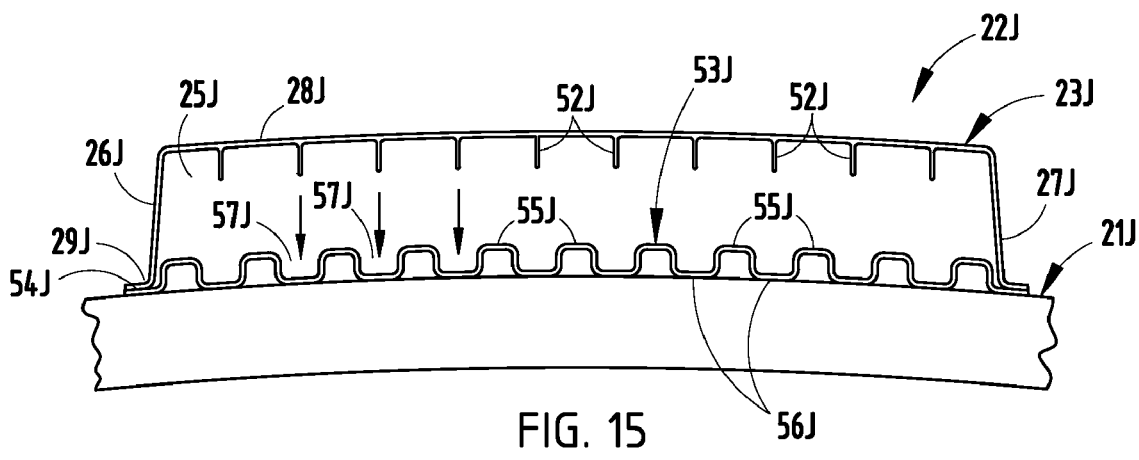
FIG. 15 is a perspective view of another modified energy absorber, the view being a longitudinal cross section through a crush lobe to illustrate internal ribs and a stabilizer component.

FIG. 15 is a perspective view of another modified energy absorber 22J including a crush lobe 23J. It is contemplated that the crush lobe 23J may (or may not) include external ribs (34). The illustrated crush lobe 23J includes internal ribs 52J that extend vertically downwardly from front wall 28J about 20% of the distance to base flange 29J, and that extend between a top wall (not specifically shown) and a bottom wall 25J of the crush lobe 23J. These ribs are used to reinforce the front wall so as to increase the load quickly during the initial portion of the impact. A wall stabilizing component 53J is mounted on a beam 21J under the energy absorber 22J. The wall stabilizing component 53J can be thermoformed (or injection molded or otherwise formed from polymeric material . . . or formed from another material such as metal). The component 53J includes a base flange 54J that engages the beam 21J, and includes a plurality of forwardly extending protrusions 55J (also called "corrugations" or "raised areas") spaced apart by intermediate walls 56J to form cavities 57J. The illustrated component 53J has protrusions 55J, which are low-height crush lobes . . . such that component 53J is itself a secondary energy absorber.

The cavities 57J are aligned with the internal ribs 52J so that, upon initial impact, there is a lower level of energy absorption as the crush lobe 55J begins to collapse (for example, this is desirable during a pedestrian impact). Then, the energy absorption increases as cavities 57J are contacted. Furthermore, the internal ribs 52J may engage the rear wall 56J. Specifically as impact stroke occurs and the crush lobe 55J collapses, the ribs 52J move into the cavities 57J where they are trapped. This maximizes the crush efficiency of initial lower load impact zone. Upon further impact, the ribs 52J engage the intermediate walls 56J and crush in a manner significantly increasing the energy absorption during impact, thus providing a "stepped increase" energy absorption. This "stepped increase" is desirable so as to provide a low load energy absorber for pedestrian impacts yet a higher load for vehicular impacts. Notably, it is significant that the cavities 57J trap the internal ribs 52J so that the ribs 52J do not bend or slip laterally in a way that does not absorb significant impact energy. By changing a depth of the ribs, the stepped increase in energy absorption occurs sooner. By changing a thickness of the ribs, the stepped increase is larger (i.e., energy absorption occurs at a faster rate). This stepped increase can also be affected by the number, position, shape, and profile of the internal ribs. For example, an internal rib with a narrower "tip" and larger "root" will, in addition to providing a stepped increase in energy absorption, will also tend to provide a different total energy absorption profile over the full stroke of impact. The illustrated protrusions 55J are effectively short crush lobes, and they increase energy absorption of the bumper system as the energy absorber 22J reaches a fully collapsed position . . . and generally before the beam 21J begins permanent deformation. By varying a thickness of the thermoformed sheet used to make component 53J, and/or by varying a height, shape, or size of the protrusions 55J, total energy absorption of the bumper system can also be advantageously affected/tuned.

Notably, the internal structure of the energy absorber 22J and stabilizing component can be any of the previously described energy absorbers (22-22I) with external ribs, or alternatively, it can be formed without external ribs. Further, the tooling for making the stabilizing component can be made very quickly with minimal lead times, and further the internal ribs can be tuned quickly, thus allowing for optimal tuning of the bumper system for energy absorption, even late in the bumper development program.

It is contemplated that the wall-stabilizing retainer component (also called a "secondary energy absorber" herein) can be made by various means (e.g., vacuum thermoforming, injection-molding, die-cutting, stamping, etc.) and can be different materials (e.g., plastic, metal, composite, etc.). The illustrated component is vacuum thermoformed of plastic material.

It is specifically contemplated that the energy absorber can be much more sophisticated and complicated than the illustrated energy absorber 20, as will be understood by skilled artisans in the art of bumper design. For example, many energy absorbers are configured to support front fascia of a vehicle and also to provide function, such as retention of wires and/or hardware (i.e., lights, grilles, etc.). Also, energy absorbers are commonly designed to provide tuned energy absorption at specific locations, such as for corner impact, front-on post impact, front-on bumper-to-bumper impact, etc. The present component 31 can be made to fit under any crush box 21 that is sufficiently elongated to require stabilization of its side walls, regardless of the crush box's position, shape, or orientation, and regardless of the energy absorber's overall shape. Further, the internal ribs 30 and the component 31 stabilize and strengthen the energy absorber 20, allowing it to be able to accommodate a wide range of designs.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A bumper system for vehicles comprising:
    an elongated reinforcement beam having a length and adapted for mounting to a vehicle frame, the beam being tubular and including a front surface that, in vertical cross sections along the length, extends vertically across the beam with a remainder of the beam being rearward of the front surface; and
    an energy absorber positioned on the front surface and substantially covering the front surface of the reinforcement beam and including a rear wall juxtaposed and abutting the front surface and further including at least one hollow crush lobe extending forward of the rear wall, the at least one crush lobe being configured to crush and absorb energy upon a vehicle crash during initial impact against the beam, the at least one crush lobe including interconnected top, bottom, end and front walls, at least one opposing pair of the walls being elongated parallel a length of the beam to define enlarged areas that are generally unsupported and including external ribs extending generally perpendicular to the length for stabilizing the enlarged areas, the top and bottom walls each defining an exterior surface and the ribs each being formed on the top and bottom walls and having a cross section protruding from the exterior surface when in a vehicle position, the top and bottom walls defining arched shapes in cross section and being substantially planar along a length of the absorber and located to crush against the front surface of the beam and having at least some of the external ribs extending short of a full distance of the non-planar shapes, at least some of the ribs having a rib length and a non-constant height along the rib length and defining T-shaped jointed arrangements with the top and bottom walls.

2. The bumper system defined in claim 1, wherein the external ribs are uniformly shaped but non-uniformly spaced across the at least one crush lobe relative to a center of the at least one crush lobe.

3. The bumper system defined in claim 1, wherein the external ribs are non-uniformly shaped but uniformly spaced across the at least one crush lobe.

4. The bumper system defined in claim 1, wherein several of the external ribs have a different length than others of the external ribs.

5. The bumper system defined in claim 1, wherein the external ribs have a length extending less than about 90% of a fore-aft dimension of the at least one crush lobe.

6. The bumper system defined in claim 5, wherein the length of the external ribs is limited to 40%-70% of the fore-aft dimension of the at least one crush lobe.

7. The bumper system defined in claim 1, wherein the external ribs have alternating different lengths.

8. The bumper system defined in claim 1, wherein the external ribs define a first spaced-apart dimension, and outboard ones of the external ribs define a second spaced-apart dimension from the end walls of the at least one crush lobe, the first spaced apart dimension being less than the second spaced apart dimension.

9. The bumper system defined in claim 1, wherein the external ribs have different cross-sectional shapes along their lengths, including shallower and deeper portions.

10. The bumper system defined in claim 1, wherein the at least one crush lobe includes a plurality of crush lobes with different shapes, including several different front wall shapes and several different end wall shapes.

11. The bumper system defined in claim 1, wherein the energy absorber includes a rear wall supporting the at least one crush lobe, the at least one crush lobe forming a cross section that is at least three times longer in a longitudinal direction than a fore-aft dimension of the at least one crush lobe.

12. The bumper system defined in claim 1, wherein at least one of the end walls of the at least one crush lobe includes a crush initiator.

13. The bumper system defined in claim 12, wherein the crush initiator includes an opening.

14. The bumper system defined in claim 13, wherein the opening is a non-circular geometric shape.

15. A bumper system for vehicles comprising:
    an elongated reinforcement beam having a length and adapted for mounting to a vehicle frame, the beam defining at least one tube and including a front surface that, in vertical cross sections along the length, extends vertically across the beam with a remainder of the beam being rearward of the front surface; and
    an energy absorber positioned on the front surface of the reinforcement beam and substantially covering the front surface and including a rear wall juxtaposed and abutting the front surface and further including a plurality of crush lobes configured to crush and absorb energy during initial impact against the beam upon a vehicle crash, the crush lobes each including interconnected top, bottom, end and front walls, at least one opposing pair of the walls being elongated parallel a length of the beam to define enlarged areas that are generally unsupported; the top and bottom walls including external ribs extending generally perpendicular to the length for stabilizing the enlarged areas; the end walls including crush-initiating apertures for reducing a crush stiffness of the end walls to tune the energy absorber to provide a more uniform resistance to impact along the length of the reinforcement beam, the top and bottom walls having a generally constant thickness defined by exterior and interior wall surfaces, and the ribs being formed on the top and bottom walls and protruding from one of the exterior surfaces, the top and bottom walls defining arched shapes in cross section and being substantially planar along a length of the absorber and located to crush against the front surface of the beam and at least some of the external ribs extending short of a full distance of the non-planar shapes, at least some of the ribs having a rib length and a non-constant height along the rib length and defining T-shaped jointed arrangements with the top and bottom walls.

16. A method of tuning a vehicle bumper system for desired energy absorption characteristics, comprising steps of:

providing a bumper subassembly including a beam defining at least one tube having a front surface that, in vertical cross sections along the length, extends vertically across the beam with a remainder of the beam being rearward of the front surface, and an energy absorber on a front of the beam that substantially covers the front surface, the energy absorber including a rear wall juxtaposed and abutting the front surface and further including at least one crush lobe extending forward of the rear wall for energy absorption during an initial impact against the bumper system, the energy absorber further including top and bottom walls with external ribs formed on the top and bottom walls and protruding therefrom to define T-shaped jointed arrangements with top and bottom walls when in a vehicle-mounted position, the top and bottom walls defining arched shapes in cross section and being substantially planar along a length of the absorber and located to crush against the front surface of the beam and at least some of the ribs extending short of a full distance of the non-planar shapes and having a non-constant rib height;

testing the bumper subassembly for energy absorption by impacting the subassembly to simulate a vehicle crash; and tuning the bumper subassembly by one of: modifying the existing external ribs on the at least one crush lobe, forming new external ribs on the at least one crush lobe, and both modifying at least one of the existing external ribs and also forming at least one new external rib.

17. The method defined in claim 16, wherein the step of tuning includes modifying existing external ribs.

18. An energy absorber apparatus for a bumper system for vehicles, where the bumper system includes and a beam defining at least one tube having a front surface that, in vertical cross sections along a length of the beam, extends vertically across the beam with a remainder of the beam being rearward of the front surface, comprising:

an energy absorber shaped and configured to be positioned on and cover the front surface of the reinforcement beam, the energy absorber including a rear wall shaped to abutting engage the front surface in a juxtaposed arrangement and including at least two hollow crush lobes extending forward of the rear wall that are configured to crush and absorb energy during initial impact against the bumper system upon a vehicle crash, the at least two crush lobes each including interconnected top, bottom, end and front walls with the top and bottom walls being elongated parallel a length of the beam to define enlarged areas that are generally unsupported, but the at least two crush lobes further including at least one external rib positioned on and having a cross section protruding from the top and bottom walls in each of the enlarged areas so that the external ribs stabilize the enlarged areas during an impact, the top and bottom walls defining arched shapes in cross section and being substantially planar along a length of the absorber and located to crush against the front surface of the beam and at least some of the external ribs extending short of a full distance of the non-planar shapes, at least some of the ribs having a rib length and a non-constant height along the rib length and defining T-shaped jointed arrangement with the top and bottom walls.

19. The energy absorber apparatus defined in claim 18, wherein a cross section longitudinally through each external rib and through associated portions of the top and bottom walls define T-shaped joined arrangements.

20. The bumper system defined in claim 1, where the front surface includes spaced channels, and the top and bottom walls of the energy absorber include rear portions generally aligned with the channels.

* * * * *